(12) United States Patent
Cox (10) Patent No.: US 9,277,140 B2
(45) Date of Patent: Mar. 1, 2016

(54) DISPLAY HUB FOR CLASSROOMS

(71) Applicant: Lumos Technologies LLC, St. George, UT (US)

(72) Inventor: Shane Cox, St. George, UT (US)

(73) Assignee: LUMOS TECHNOLOGIES LLC, St. George, UT (US)

(*) Notice: Subject to any disclaimer, the term of this patent is extended or adjusted under 35 U.S.C. 154(b) by 0 days.

(21) Appl. No.: 14/295,436

(22) Filed: Jun. 4, 2014

(65) Prior Publication Data

US 2015/0358553 A1    Dec. 10, 2015

(51) Int. Cl.
*H04N 7/18* (2006.01)
*H04N 5/268* (2006.01)
*H04N 5/265* (2006.01)

(52) U.S. Cl.
CPC ............... *H04N 5/268* (2013.01); *H04N 5/265* (2013.01)

(58) Field of Classification Search
CPC ...................... H04N 21/43615; H04N 7/17318
See application file for complete search history.

(56) References Cited

U.S. PATENT DOCUMENTS

| 2008/0137558 | A1* | 6/2008 | Baird | 370/260 |
| 2011/0219066 | A1* | 9/2011 | Saint Clair et al. | 709/203 |
| 2012/0081502 | A1* | 4/2012 | Naidu | H04N 7/147 348/14.04 |
| 2012/0133728 | A1* | 5/2012 | Lee | 348/14.08 |
| 2013/0013679 | A1* | 1/2013 | Lahartinger | 709/204 |

FOREIGN PATENT DOCUMENTS

WO    WO2012027600 A2 *   3/2012

* cited by examiner

*Primary Examiner* — Nathan Flynn
*Assistant Examiner* — Alfonso Castro
(74) *Attorney, Agent, or Firm* — Maschoff Brennan (57) ABSTRACT

An audio and video control device is disclosed. In some embodiments, the audio and video control device may include one or more of a first Wi-Fi transceiver; a second Wi-Fi transceiver; a Bluetooth® transceiver; a microphone input; an HDMI input; a video output; an audio output; an IR output; an Ethernet connection; a paging input; and/or a controller. The controller may be configured to receive a video signal from at least one of the first Wi-Fi transceiver, the second Wi-Fi transceiver, and the HDMI input; output at least a portion of the video signal through the video output; output at least a portion of an audio portion of the video signal through the audio output; receive audio data from the microphone input; and/or output the audio data through the audio output.

19 Claims, 8 Drawing Sheets

DISPLAY HUB FOR CLASSROOMS

BACKGROUND

Classrooms in the 21st century include a number of audiovisual devices that may be used to display information to students. These devices include tablets, smartphones, computers, cameras, projectors, and smart boards, among others. Each of these devices may be used to supplement and/or improve classroom instructions and increase student learning.

SUMMARY

An audio and video control device is disclosed according to some embodiments described herein. In some embodiments, the audio and video control device may include one or more of a first Wi-Fi transceiver; a second Wi-Fi transceiver; a Bluetooth® transceiver; a microphone input; an HDMI input; a video output; an audio output; an IR output; an Ethernet connection; and/or a paging input and/or a controller. The controller may be configured to receive a video signal from at least one of the first Wi-Fi transceiver, the second Wi-Fi transceiver, and the HDMI input; output at least a portion of the video signal through the video output; output at least a portion of an audio portion of the video signal through the audio output; receive audio data from the microphone input; and/or output the audio data through the audio output.

A method is also disclosed according to some embodiments described herein. The method may include broadcasting a first Wi-Fi signal from a first Wi-Fi transceiver; broadcasting a second Wi-Fi signal from a second Wi-Fi transceiver; receiving first video data through the second Wi-Fi transceiver; receiving first control instructions through the first Wi-Fi transceiver; and outputting the first video data in response to the first control instructions. The method may also include receiving second video data through the second Wi-Fi transceiver; receiving second control instructions through the first Wi-Fi transceiver; and outputting the second video data in response to the second control instructions. The method may also include receiving second video data through the first Wi-Fi transceiver; receiving second control instructions through the first Wi-Fi transceiver; and outputting the second video data in response to the second control instructions.

Various other devices, systems, and/or methods are disclosed according to some embodiments described herein.

These illustrative embodiments are mentioned not to limit or define the disclosure, but to provide examples to aid understanding thereof. Additional embodiments are discussed in the Detailed Description, and further description is provided there. Advantages offered by one or more of the various embodiments may be further understood by examining this specification or by practicing one or more embodiments presented.

BRIEF DESCRIPTION OF THE FIGURES

These and other features, aspects, and advantages of the present disclosure are better understood when the following Detailed Description is read with reference to the accompanying drawings.

DETAILED DESCRIPTION

Systems and methods are disclosed for improving coordination among electronic devices in a classroom. An audio and video control device is described in more detail below that may be used by instructors to tie together a number of electronic devices in a manner that is simple and easy for a teacher to control.

Figure 1:
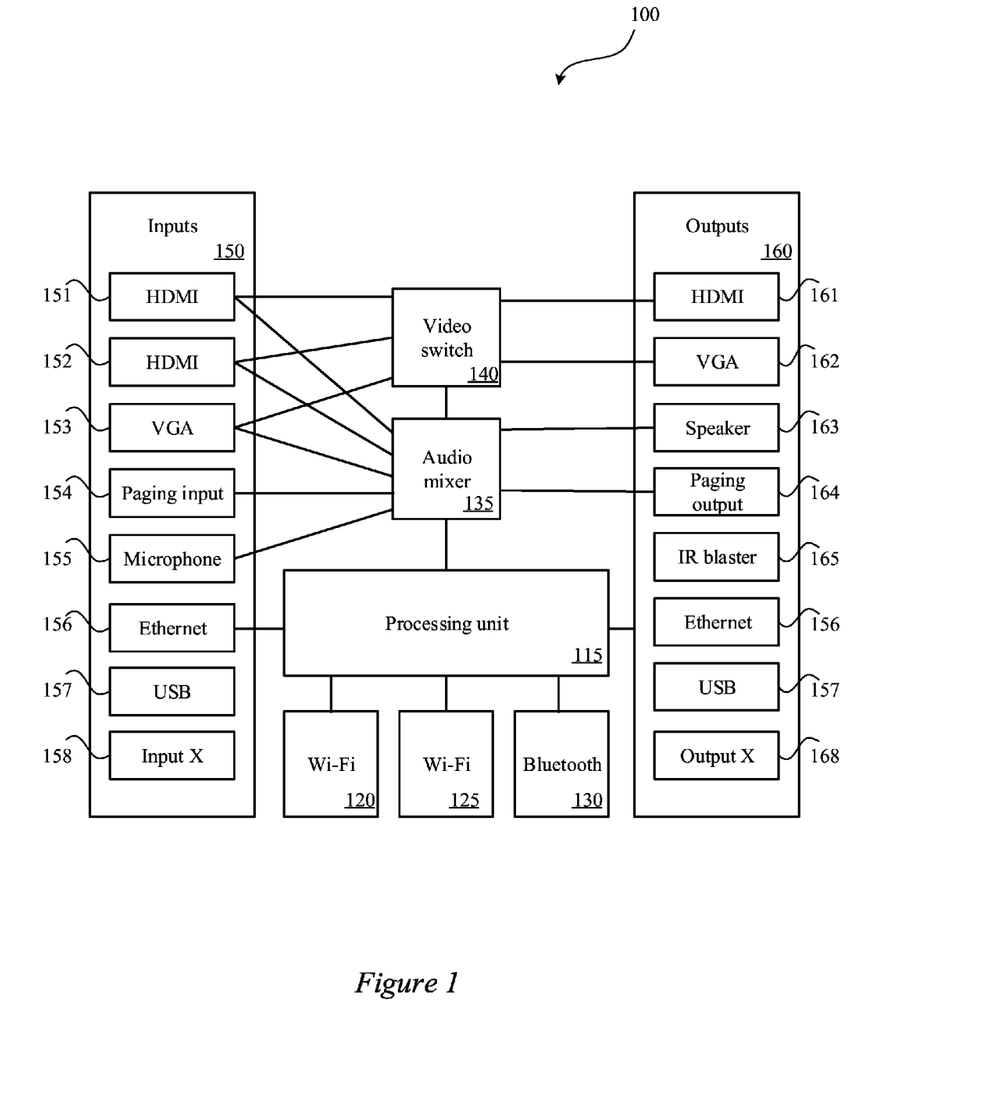
FIG. 1 illustrates an example audio and video control device according to some embodiments described herein.

FIG. 1 illustrates an example audio and video control device 100 according to some embodiments described herein. The audio and video control device 100 may include a number of inputs 150, outputs 160 and/or connections 120, 125, and 130. Any of the inputs 150 and/or the outputs 160 may be wired or wireless.

The inputs 150 may include any of the inputs shown in the figure. All or a subset of the inputs shown may or may not be included. Some of the additional inputs may include any video, audio, or network input. The inputs 150 may include video inputs such as, for example, a first HDMI input 151, a second HDMI input 152, and/or a VGA input 153. The inputs 150 may also include audio inputs such as, for example, a paging input 154 and/or a microphone input 155. The inputs 150 may also include hardware communication inputs such as, for example, an Ethernet connection 156 and/or a USB input 157. The inputs 150 may also include various other inputs without reservation as indicated by input X 158.

The outputs 160 may include any of the outputs shown in the figure. All or a subset of the outputs shown may or may not be included. Some of the additional outputs may include any video, audio, or network output. The outputs 160 may include video outputs such as, for example, HDMI 161 and/or VGA 162. The outputs 160 may also include audio outputs such as, for example, a speaker output 163 and/or a paging output 164. The outputs 160 may also include, for example, an IR blaster 165. The outputs 160 may also include hardware communication outputs such as, for example, the Ethernet connection 156 and/or the USB input 157. The outputs 160 may also include various other inputs without reservation as indicated by input X 168.

The audio and video control device 100 may also include a first Wi-Fi transceiver 120, a second Wi-Fi transceiver 125, and/or a Bluetooth® transceiver 130. The audio and video control device 100 may also include a digital enhanced cordless telecommunications (DECT) transceiver. The DECT transceiver may be used, for example, to receive audio signals such as microphone and/or paging signals.

The first Wi-Fi transceiver 120 and/or the second Wi-Fi transceiver 125 may include one or more Wi-Fi antennas, Wi-Fi logic, and/or memory. The first Wi-Fi transceiver 120 and/or the second Wi-Fi transceiver 125 may be used to communicate wirelessly with a Wi-Fi modem or router and/or another Wi-Fi transceiver. Any type of the first Wi-Fi transceiver 120 and/or the second Wi-Fi transceiver 125 or Wi-Fi components may be used. In some embodiments, the first Wi-Fi transceiver 120 and/or the second Wi-Fi transceiver 125, for example, may be used to transmit and/or receive video and/or audio signals from a remote device. In some embodiments, the first Wi-Fi transceiver 120 and/or the second Wi-Fi transceiver 125, for example, may be used to transmit and/or receive control instructions from a remote device.

In some embodiments, the first Wi-Fi transceiver 120 may be configured to connect the audio and video control device 100 with a Wi-Fi router that is coupled with a computer network such as, for example, an intranet and/or the Internet. In some embodiments, the Ethernet connection 156 may also be used to connect the audio and video control device 100 to the network.

In some embodiments, the second Wi-Fi transceiver 125 may be configured to operate as an ad hoc network, Wi-Fi hotspot, or Wi-Fi Direct. As described in more detail below, this ad hoc network, for example, may connect a plurality of local devices with the second Wi-Fi transceiver 125 and connect these to the local devices with an intranet or the Internet through the first Wi-Fi transceiver 120 and/or the Ethernet connection 156. In some embodiments, when the control device 100 is connected to the intranet and/or the internet via the Ethernet Connection 156 the First Wi-Fi transceiver 120 may be configured to broadcast as a secondary Wi-Fi hotspot, which may be used, for example, to provide a separate Wi-Fi channel for a few devices such as, for example, the teacher's computer, laptop, tablet or smartphone, while the students are connected through a primary Wi-Fi router. The may be done, for example, to separate data traffic between the teacher's devices and the various student devices. In some embodiments, the second Wi-Fi transceiver 125 may operate with a lower transmission power than the first Wi-Fi transceiver 120 in order to only connect with devices within a smaller geographic location such as, for example, a classroom. In some embodiments, the second Wi-Fi transceiver 125 may have a lower tolerance for communication with local devices than the first Wi-Fi transceiver 120. For example, the second Wi-Fi transceiver 125 may be configured to only connect with local devices that have a transmission power above threshold that is higher than the threshold of the first Wi-Fi transceiver 120.

In some embodiments, the first Wi-Fi transceiver 120 and the second Wi-Fi transceiver 125 may be separate and distinct transceivers. In some embodiments, the first Wi-Fi transceiver 120 and the second Wi-Fi transceiver 125 may be the same transceiver and/or share components.

The Bluetooth® transceiver 130 may include a Bluetooth® antenna, control logic, and/or memory. The Bluetooth® transceiver 130 may include any other type of Bluetooth® components, and/or may be used to communicate with other Bluetooth®-enabled devices. For example, the Bluetooth® transceiver may include Bluetooth® low energy (Bluetooth® LE, BTLE, or BLE) and/or Bluetooth® Smart components that operate with lower energy consumption. The Bluetooth® transceiver 130 may communicate with various other Bluetooth®-enabled devices. In some embodiments, the Bluetooth® transceiver 130, for example, may be used to transmit and/or receive control instructions from a remote device.

A video switch 140 may include any device that can switch multiple video inputs such as, for example, the first HDMI input 151, the second HDMI input 152, the VGA input 153, network video, display mirroring, etc. to output the video to HDMI 161 and/or VGA 162 and output audio to speakers 163. Network video may, for example, be video data that is streamed from an intranet or the Internet via the Ethernet connection 156 or the first Wi-Fi transceiver 120 and processed by a processing unit 115. Display mirroring may, for example, be device display data mirrored from a local device such as, for example, a laptop, computer, tablet, smartphone, television, DVD player, Blu-ray player, etc.

The video switch 140 may switch between inputs and/or outputs in response to instructions and/or a signal from the processing unit 115. The video switch 140 may be a separate hardware unit and/or a processing module executed by the processing unit 115.

An audio mixer 135 may switch and/or mix audio from multiple sources and output the audio to the speakers 163 and/or the paging input 154. In some embodiments, the audio mixer 135 may output audio portions of video data being output from the video switch 140. In some embodiments, audio from the microphone input 155 may be mixed with the audio portions of the video data prior to outputting the audio to the speakers 163. In some embodiments, the paging input 154 from the paging system may override all other inputs and output the paging input via the speakers 163. In some embodiments, audio from the microphone input 155 may be transmitted to the paging output 164 in response to a paging input and/or in response to selection by or an indication from a user. Moreover, audio from other sources may be turned off while the microphone input 155 is transmitted to the paging output 164.

The IR blaster 165 (or infrared blaster) may emulate an infrared remote control to autonomously control a device that is normally controlled only by remote control key presses. The IR blaster 165, for example, may control a display 245. For example, the IR blaster 165 may be used to turn the display on, off, or adjust various settings of the IR blaster 165. The IR blaster 165 may be used to control the opening and/or closing of a display screen.

Figure 2:
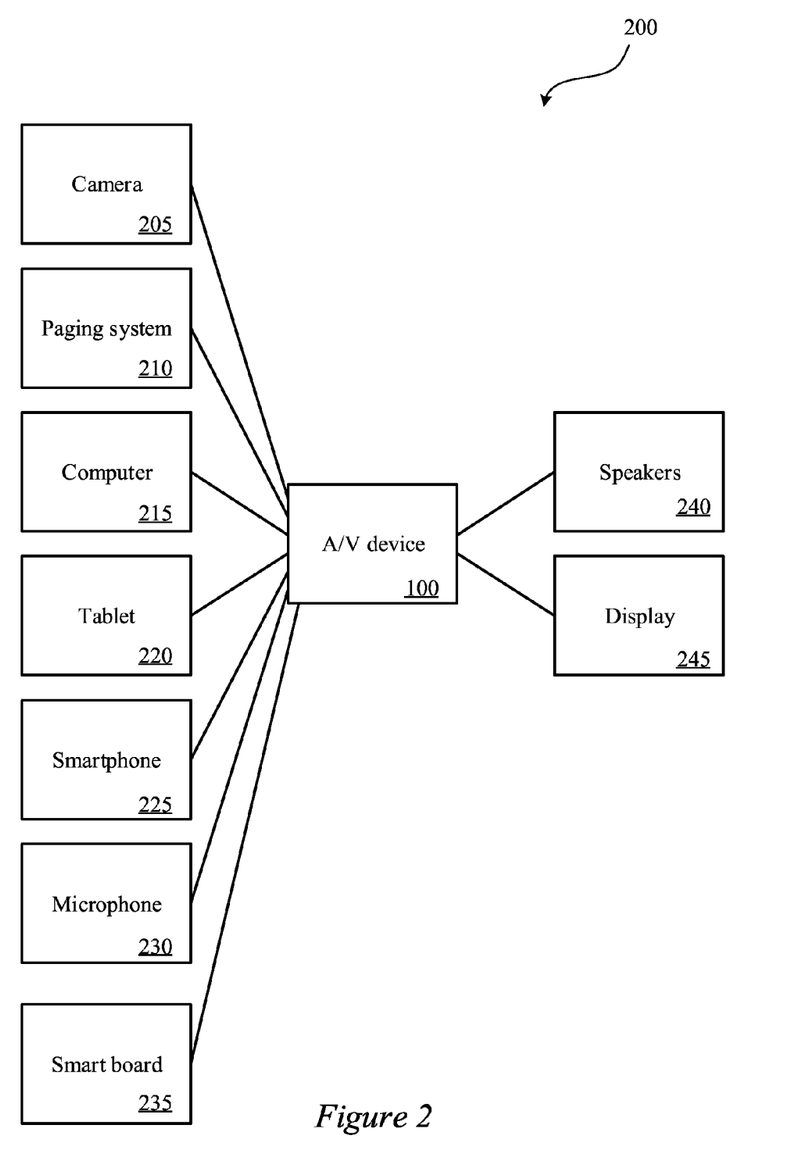
FIG. 2 illustrates an example system of an audio and video control device coupled with a number of external devices according to some embodiments described herein.

FIG. 2 illustrates an example system 200 of the audio and video control device 100 coupled with a number of external devices according to some embodiments described herein. The audio and video control device 100 may be coupled with a camera 205, a paging system 210, a computer 215, a tablet 220, a smartphone 225, a microphone 230, and/or a smart board 235. The audio and video control device 100 may also be in communication with speakers 240 and/or the display 245.

The camera 205 may be, for example, a document camera or a lab bench camera or a web cam. Input from the camera 205 may be made via the first HDMI input 151, the second HDMI input 152, the VGA input 153, the Ethernet connection 156, the first Wi-Fi transceiver 120, the second Wi-Fi transceiver 125, the input X 158, and/or any other input.

The paging system 210 may include a paging system for a building, wing, and/or campus. The paging system 210, for example, may provide a communication means between an office and a classroom. The paging system 210 may be connected with the paging input 154 and/or the paging output 164. The paging system 210 may communicate an audio input to the audio and video control device 100 and/or an audio output to the audio and video control device 100.

The computer 215 may include any type of computer such as, for example, a desktop computer and/or a laptop computer. The computer 215 may input data to the audio and video control device 100 via the audio and video control device's Ethernet connection 156, the first Wi-Fi transceiver 120, the second Wi-Fi transceiver 125, the USB 157, the VGA input 153, the second HDMI input 152, and/or the first HDMI input 151. In some embodiments, the computer 215 may provide mirrored display data such that the images, presentations, characters, images, etc. being displayed on the display on the computer 215 may be "mirrored" to the audio and video control device 100 so that it may be displayed elsewhere.

The tablet 220 may be any type of tablet computer device. The tablet 220 may input data to the audio and video control device 100 via the audio and video control device's Ethernet connection 156, the first Wi-Fi transceiver 120, and/or the second Wi-Fi transceiver 125. In some embodiments, the tablet 220 may provide mirrored display data such that the images, presentations, characters, images, etc. being displayed on the display on the tablet 220 may be "mirrored" to the audio and video control device 100 so that it may be displayed elsewhere. The tablet 220 may also send instructions to the audio and video control device 100. These instructions may include, for example, instructions to switch the video input from one input to another input.

The smartphone 225 may be any type of smartphone. The smartphone 225 may input data to the audio and video control device 100 via the audio and video control device's Ethernet connection 156, the first Wi-Fi transceiver 120, and/or the second Wi-Fi transceiver 125. In some embodiments, the smartphone 225 may provide mirrored display data such that the images, presentations, characters, images, etc. being displayed on the display on the smartphone 225 may be "mirrored" to the audio and video control device 100 so that it may be displayed elsewhere. The smartphone 225 may also send instructions to the audio and video control device 100. These instructions may include, for example, instructions to switch the video input from one input to another input.

The tablet 220, the computer 215, and/or the smartphone 225 may include applications and/or apps on computer-readable medium stored in memory for executing various operations. These operations may include sending and/or receiving instructions to and/or from the audio and video control device 100. These operations may include, for example, switching inputs between the inputs 150, switching outputs between the outputs 160, mirroring functionality so that the display of the tablet 220, the computer 215, and/or the smartphone 225 is displayed on the display 245.

The microphone 230 may include any type of wired or wireless microphone. In some embodiments, the microphone may be a Bluetooth® enabled microphone. In some embodiments, the microphone may be a DECT enabled microphone.

The smart board 235 may include any type of interactive whiteboard. The audio and video control device 100 may control the functions, inputs, and/or outputs of the smart board 235. This may include, for example, receiving data from the smart board 235 and/or communicating data to be displayed on the smart board 235. The smart board 235 may provide video input through the audio and video control device's Ethernet connection 156, the first Wi-Fi transceiver 120, the second Wi-Fi transceiver 125, the USB 157, the VGA input 153, the second HDMI input 152, and/or the first HDMI input 151. The smart board 235 may also provide control inputs from a user through the smart board 235.

The audio and video control device 100 may receive inputs from any of the devices described above as well as many other devices and/or types of devices. These inputs may be switched and/or mixed and the audio portion may be sent to the speakers 240 and/or to the display 245. The display 245, for example, may be any type of display such as, for example, a projector, an LCD display, a plasma display, etc.

Figure 3:
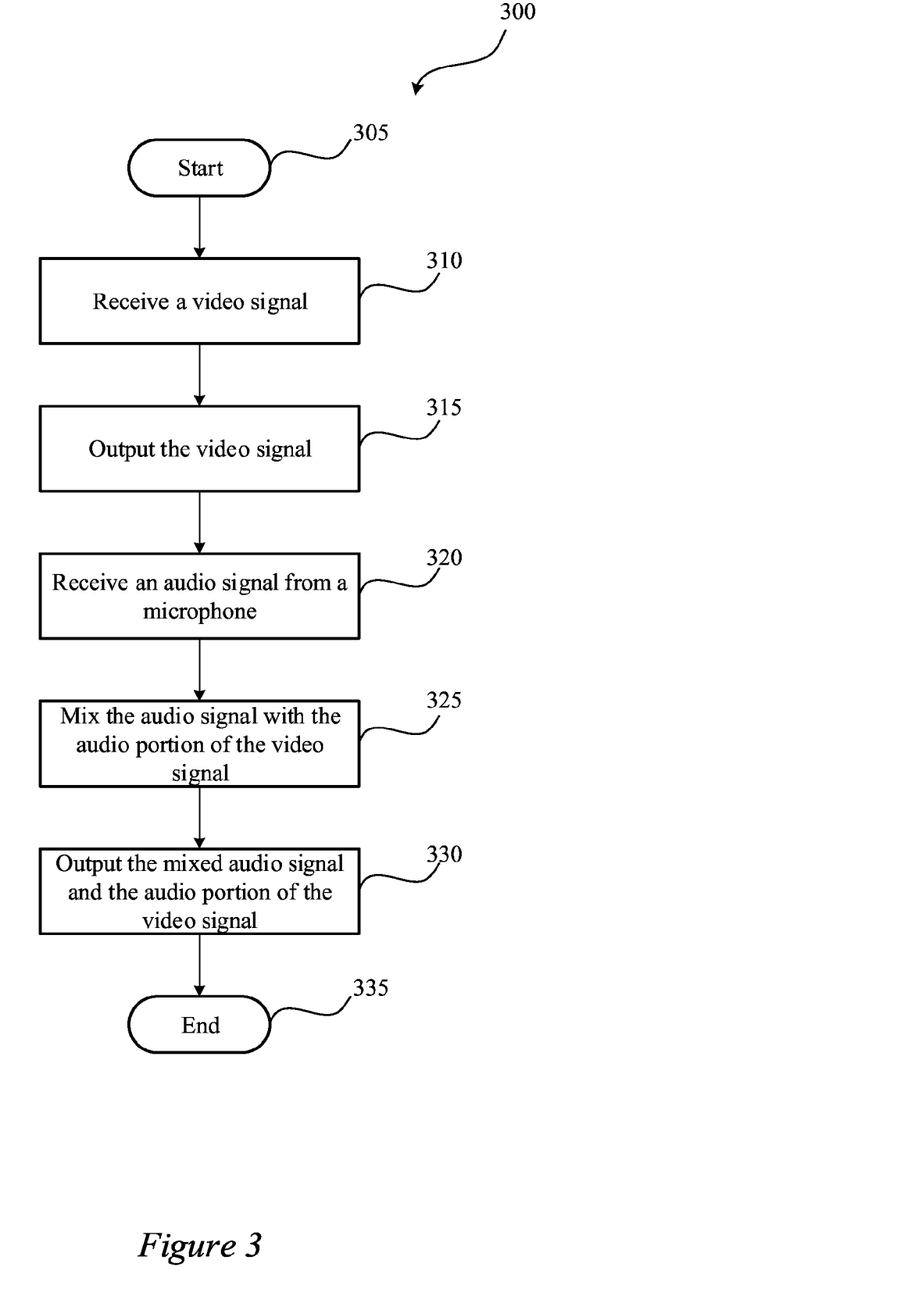
FIG. 3 is an example flowchart of a process for mixing audio signals at an audio and video control device according to some embodiments described herein.

FIG. 3 is an example flowchart of a process 300 for mixing audio signals at the audio and video control device according to some embodiments described herein. One or more steps of the process 300 may be implemented, in some embodiments, by one or more components of the audio and video control device 100 of FIG. 1, such as by the processing unit 115. Although illustrated as discrete blocks, various blocks may be divided into additional blocks, combined into fewer blocks, or eliminated, depending on the desired implementation.

The process 300 starts at block 305. At block 310 a video signal may be received from an input. The video signal may be received through a first input that may include, for example, the first HDMI input 151, the second HDMI input 152, the VGA input 153, the Ethernet connection 156, the first Wi-Fi transceiver 120, the second Wi-Fi transceiver 125, and/or the Bluetooth® transceiver 130. The video signal may be received in any format. For example, the video signal may be received as an analog signal or a digital signal. The video signal may be received from any external component such as, for example, those shown in FIG. 2. Moreover, the video signal may be received from a device through the Internet, an intranet, and/or a network.

At block 315 the video signal may be output to the display 245 and the audio portion of the video may be output to the speakers 240.

At block 320 an audio signal may be received from the microphone 230. The audio signal may sent to the audio and video control device 100 via a wired or wireless network such as, for example, from a Bluetooth®-enabled microphone, from a Wi-Fi-enabled microphone, from an RCA connection, from a DECT enabled microphone, etc.

At block 325 the audio signal from the microphone may be mixed with the audio portion of the video signal. For example, the audio from the microphone and the audio from the video signal may be mixed so that the audio signal from the microphone is more than 30%, 35%, 40%, 45%, 50%, 55%, 60%, 65%, 70%, 75%, 80%, etc. of the maximum output power or the average output power of the audio portion of the video signal prior to mixing or the maximum power of the mixed signal. The mixing ratio may be made based on a preset value, a user selectable value, etc.

At block 330 the mixed audio signal may be output to the speakers 240. The process 300 may end at block 335.

The process 300 may be implemented in any number of ways. For example, at block 310 a video signal may be received at the audio and video control device 100 from the computer 215 through the first Wi-Fi transceiver 120. The audio portion of the video signal may be output to a plurality of the speakers 240 positioned in a classroom and the video signal may be output to a projector (the display 245) that projects the video signal on a wall of the classroom using any of the outputs of the audio and video control device 100. At block 320 the teacher may discuss a portion of the video by speaking into the microphone 230. The microphone 230 may send an audio signal representing the teacher's voice to the audio and video control device 100 via a Bluetooth® signal. The audio and video control device 100 may then combine the audio portion of the video signal and the audio signal of the teacher's voice based on a preset or predetermined mixing ratio. The mixed audio may be output to the speakers 240.

As another example, at block 310 a video signal may be received at the audio and video control device 100 from the Internet through the Ethernet connection 156. The video signal, for example, may comprise digital packets of data that may be unpackaged, decompressed, decrypted, and/or converted to a video stream. The audio portion of the video signal may be output to a plurality of the speakers 240 positioned in a classroom and the video signal may be output to a projector (the display 245) that projects the video signal on a wall of the classroom using any of the outputs of the audio and video control device 100. At block 320 the teacher may discuss a portion of the video by speaking into the microphone 230. The microphone 230 may send an audio signal representing the teacher's voice to the audio and video control device 100 via an infrared signal. The audio and video control device 100 may then combine the audio portion of the video signal and the audio signal of the teacher's voice based on a preset or predetermined mixing ratio. The mixed audio may be output to the speakers 240.

Figure 4:
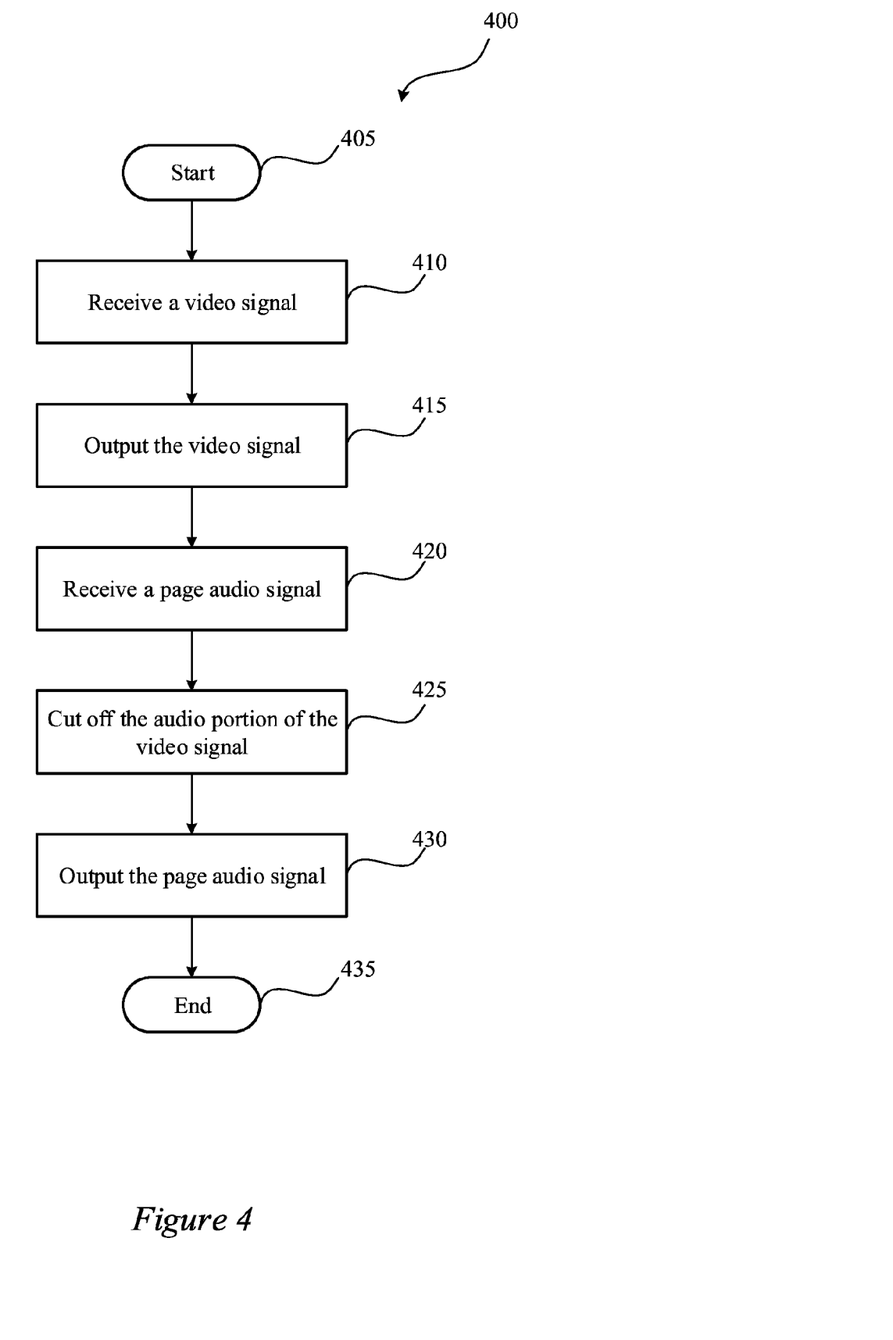
FIG. 4 is an example flowchart of a process for overriding audio with a paging signal according to some embodiments described herein.

FIG. 4 is an example flowchart of a process for overriding audio with a paging signal according to some embodiments described herein. One or more steps of a process 400 may be implemented, in some embodiments, by one or more components of the audio and video control device 100 of FIG. 1, such as by the processing unit 115. Although illustrated as discrete blocks, various blocks may be divided into additional blocks, combined into fewer blocks, or eliminated, depending on the desired implementation.

The process 400 begins at block 405. Block 410 may be similar to block 310 of the process 300 of FIG. 3; and block 415 may be similar to block 315 of the process 300 of FIG. 3.

At block 410 a video signal may be received from an input. The video signal may be received through a first input that may include, for example, the first HDMI input 151, the second HDMI input 152, the VGA input 153, the Ethernet connection 156, the first Wi-Fi transceiver 120, the second Wi-Fi transceiver 125, and/or the Bluetooth® transceiver 130. The video signal may be received in any format. For example, the video signal may be received as an analog signal or a digital signal. The video signal may be received from any external component such as, for example, those shown in FIG. 2. Moreover, the video signal may be received from a device through the Internet, an intranet, and/or a network.

At block 415, the video signal may be output to the display 245, and the audio portion of the video may be output to the speakers 240.

At block 420, a paging audio signal may be received, for example, through the paging input 154. For example, the audio and video control device 100 may monitor the signal (or voltage) of the paging input 154. When a signal or voltage above a threshold value is detected, then, at block 425, a paging input has been received. In response, the audio portion of the video signal may be cut off from the speakers 240. At block 430 the paging audio signal may be output to the speakers 240. Once the page has been completed, for example, when the paging input 154 is below the threshold value for a predetermined period of time, the process 400 may be begin again at block 410. The process 400 may end at block 435.

Alternatively or additionally, at block 430 the audio and video control device 100 may pause the output of the video signal when the paging audio signal is received. For example, the audio and video control device 100 may receive the video signal from the computer 215 via the first HDMI input 151. In response to receiving a paging audio signal above a threshold value, the audio and video control device 100 may communicate a request to pause the video signal to the computer 215 through the Bluetooth® transceiver 130, the first Wi-Fi transceiver 120, and/or the second Wi-Fi transceiver 125. Once the paging audio signal is below a threshold value for a predetermined period of time, the audio and video control device 100 may communicate a request to resume the video signal to the computer 215.

As another example, the audio and video control device 100 may receive the video signal from a remote server via the first Wi-Fi transceiver 120, the second Wi-Fi transceiver 125, and/or the Ethernet connection 156. In response to receiving a paging audio signal above a threshold value, the audio and video control device 100 may pause the video being displayed via the display 245 and may continue buffering the video. Once the paging audio signal is below a threshold value for a predetermined period of time, the audio and video control device 100 may resume the video signal.

Alternatively or additionally, at block 430 the audio and video control device 100 may pause the output of the video signal when the paging audio signal is received but may not output any signal to the speakers 240. Instead, the paging signal may be output to a dedicated standalone paging system that may include speakers. In this way, for example, the audio and video control device 100 may turn off the audio output while working in conjunction with an existing paging system.

Figure 5:
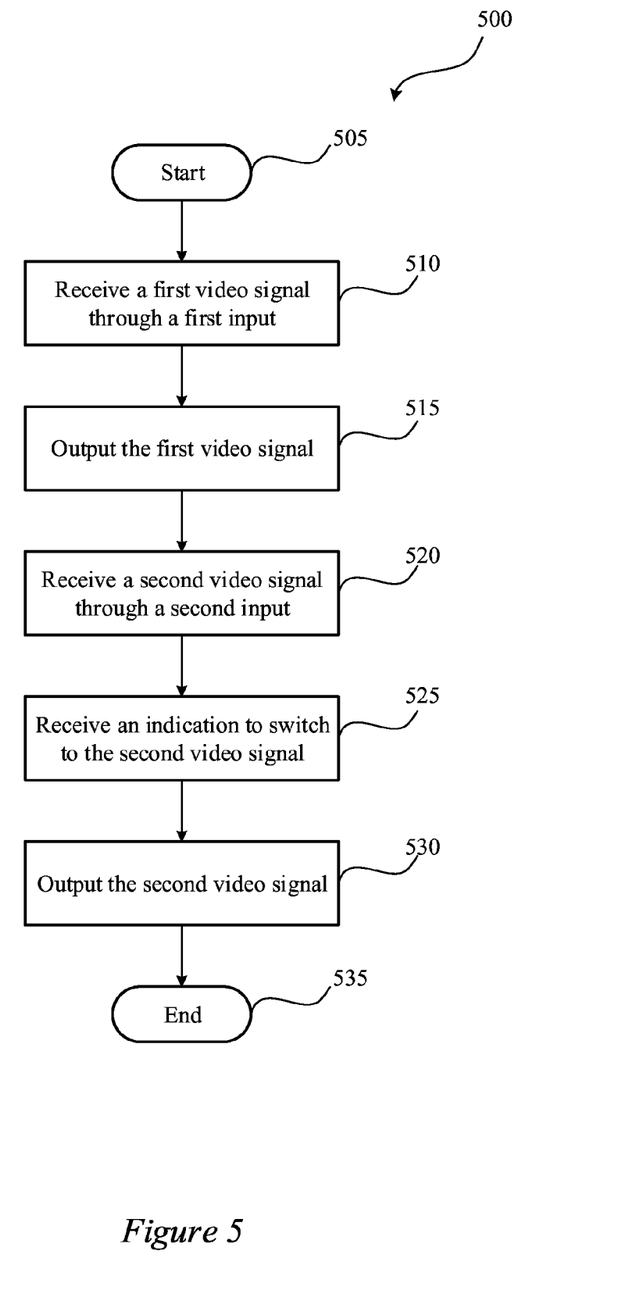
FIG. 5 is an example flowchart of a process for switching video signals according to some embodiments described herein.

FIG. 5 is an example flowchart of a process for switching video signals according to some embodiments described herein. One or more steps of a process 500 may be implemented, in some embodiments, by one or more components of the audio and video control device 100 of FIG. 1, such as by the processing unit 115. Although illustrated as discrete blocks, various blocks may be divided into additional blocks, combined into fewer blocks, or eliminated, depending on the desired implementation.

The process 500 begins at block 505. At block 510 a first video signal may be received from a first input. The first input may include, for example, the first HDMI input 151, the second HDMI input 152, the VGA input 153, the Ethernet connection 156, the first Wi-Fi transceiver 120, the second Wi-Fi transceiver 125, and/or the Bluetooth® transceiver 130. The first video signal may be received in any format. For example, the first video signal may be received as an analog signal or a digital signal. The first video signal may be received from any external component such as, for example, those shown in FIG. 2. Moreover, the first video signal may be received from a device through the Internet, an intranet, and/or a network.

At block 515, the first video signal may be output to the display 245, and/or the audio portion of the video may be output to the speakers 240.

At block 520 a second video signal may be received from a first input. The second video input may include, for example, the first HDMI input 151, the second HDMI input 152, the VGA input 153, the Ethernet connection 156, the first Wi-Fi transceiver 120, the second Wi-Fi transceiver 125, and/or the Bluetooth® transceiver 130. The second video signal may be received from an input that is different from the input where the first video signal was received. The second video signal may be received in any format. For example, the second video signal may be received as an analog signal or a digital signal. The second video signal may be received from any external component such as, for example, those shown in FIG. 2. Moreover, the second video signal may be received from a device through the Internet, an intranet and/or a network.

At block 525 an indication may be received at the audio and video control device 100 to switch the output to the display 245 and/or the speakers 240 to the second video signal. In some embodiments, the indication may be received from another device through the Bluetooth® transceiver 130, the Ethernet connection 156, the first Wi-Fi transceiver 120, the second Wi-Fi transceiver 125, or via a smart board 235, and/or any of the other inputs.

At block 530, the second video signal may be output to the display 245, and/or the audio portion of the video may be output to the speakers 240. The process 530 may end at block 535.

For example, at block 510 the first video signal may be received from the computer 215 through the first HDMI input 151 and at block 520 the second video signal may be received from the tablet 220 through the second Wi-Fi transceiver 125. The second video signal may be processed through the processing unit 115 prior to being sent to the video switch 140 and/or the audio mixer 135. At block 515 the first video signal received from the computer 215 may be output to the display 245. At block 520 an indication may be received from the smartphone 225 through the Bluetooth® transceiver 130 and/or the first Wi-Fi transceiver 120 operating in an ad hoc mode. The indication may include a command specifying that the video switch 140 should switch the respective inputs from the first video signal to the second video signal, and/or the audio mixer 135 should switch the respective inputs from the audio portion of the first video signal to the audio portion of the second video signal. The processing unit 115 may receive the indication and, based on computer program executing within the processing unit 115, the processing unit 115 may send a signal to the video switch 140 and/or the audio mixer 135 to switch the inputs.

The indication to switch inputs may comprise any number of data formats and may depend on the device from which the request was received. The indication may include one or more packets of data that include headers and/or data organized according to a protocol that specifies commands to execute by the processing unit 115.

As another example, at block 510 the first video signal may be received from the computer 215 through the first Wi-Fi transceiver 120 operating in an ad hoc mode, and at block 520 the second video signal may be received from the Internet through the second Wi-Fi transceiver 125. Both the first video signal and the second video signal may be processed through the processing unit 115 prior to being sent to the video switch 140 and/or the audio mixer 135. At block 515 the first video signal received from the computer 215 may be output to the display 245. At block 520 an indication may be received from the smartphone 225 through the Bluetooth® transceiver 130 and/or the first Wi-Fi transceiver 120 operating in an ad hoc mode. The indication may include a command specifying that the video switch 140 should switch the respective inputs from the first video signal to the second video signal, and/or the audio mixer 135 should switch the respective inputs from the audio portion of the first video signal to the audio portion of the second video signal. The processing unit 115 may receive the indication and, based on computer program executing within the processing unit 115, the processing unit 115 may send a signal to the video switch 140 and/or the audio mixer 135 to switch the inputs.

Figure 6:
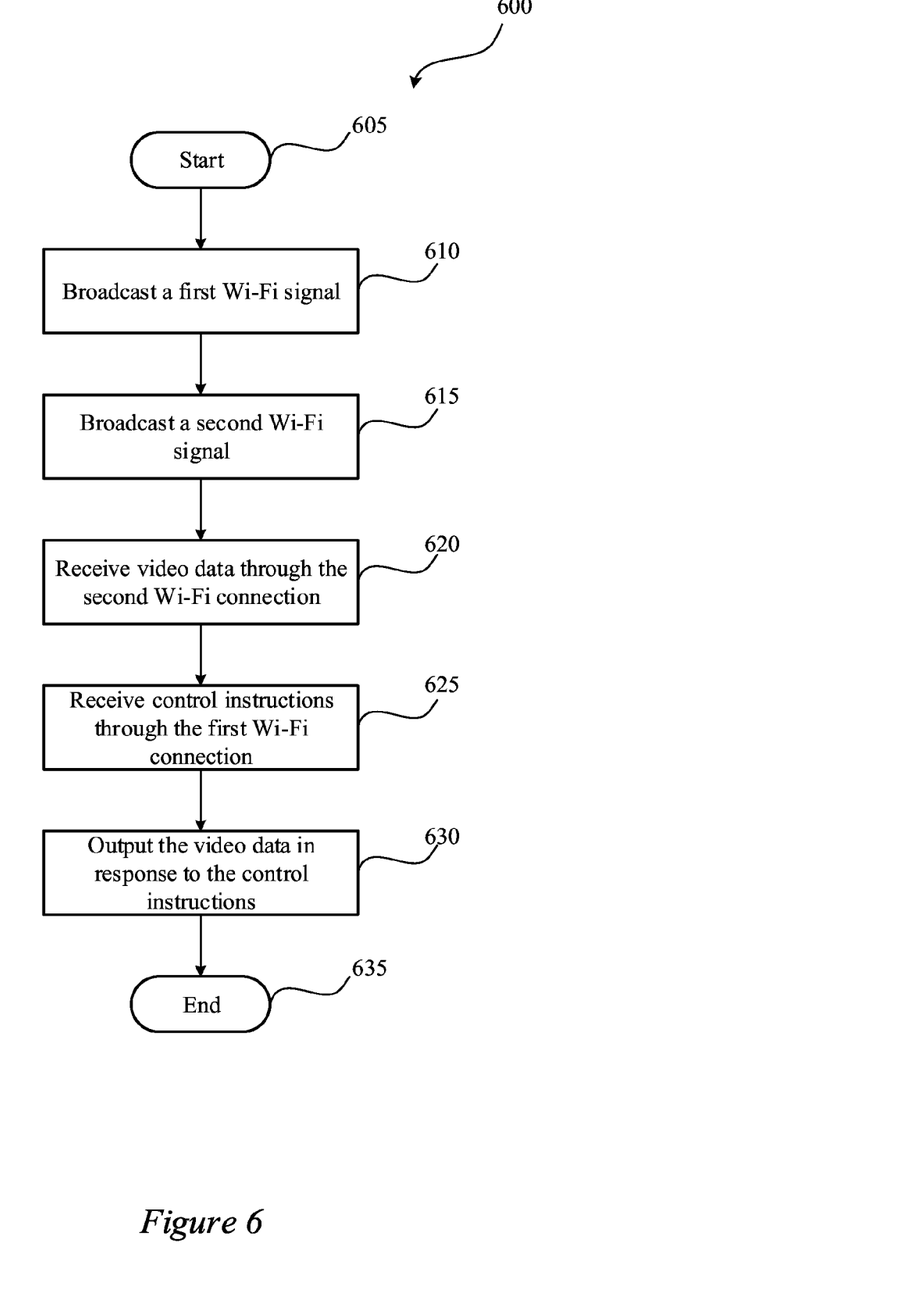
FIG. 6 is an example flowchart of a process for controlling an audio and video control device according to some embodiments described herein.

FIG. 6 is an example flowchart of a process for controlling an audio and video control device according to some embodiments described herein. One or more steps of a process 600 may be implemented, in some embodiments, by one or more components of the audio and video control device 100 of FIG. 1, such as by the processing unit 115. Although illustrated as discrete blocks, various blocks may be divided into additional blocks, combined into fewer blocks, or eliminated, depending on the desired implementation.

The process 600 begins at block 605. At block 610 a first Wi-Fi connection may be broadcast within an architectural space such as, for example, a classroom. The first Wi-Fi connection may be broadcast, for example, via the first Wi-Fi transceiver 120. In some embodiments, the first Wi-Fi connection may be part of an ad hoc network. In some embodiments, the first Wi-Fi connection may connect with devices within the architectural space such as, for example, the camera 205, the paging system 210, the computer 215, the tablet 220, the smartphone 225, the microphone 230, and/or the smart board 235.

In some embodiments, the first Wi-Fi connection may be a low power connection in order to limit the communication of the first Wi-Fi transceiver 120 to local devices such as, for example, those within the architectural space. Alternatively or additionally, the first Wi-Fi transceiver may be configured to operate so that it only connects with devices having a signal with a power above a certain threshold to ensure that such devices are within the architectural space.

At block 615 a second Wi-Fi connection may be broadcast within the architectural space such as, for example, the classroom. The second Wi-Fi connection may be broadcast, for example, via the second Wi-Fi transceiver 125. The second Wi-Fi connection may connect the audio and video control device 100 to the Internet, an intranet, or another network through a corresponding Wi-Fi router. In some embodiments, the second Wi-Fi connection may not connect with the same devices as the first Wi-Fi connection. In some embodiments, the second Wi-Fi connection may be used to stream a video from a remote data location through the Internet, an intranet, and/or another network location.

At block 620 display data may be received through the second Wi-Fi connection. The video data may be received, for example, om the Internet, an intranet, or a network location. The display data may be buffered at the processing unit 115 of the audio and video control device 100.

At block 625 control instructions may be received at the audio and video control device 100 through the first Wi-Fi connection from a local device, such as, for example, the computer 215, the tablet 220, and/or the smartphone 225. The control instructions may specify that the video data received at the second Wi-Fi transceiver 125 is displayed on the display 245. At block 630 the video data may be output on the display 245. The process 600 may end at block 635.

Figure 7:
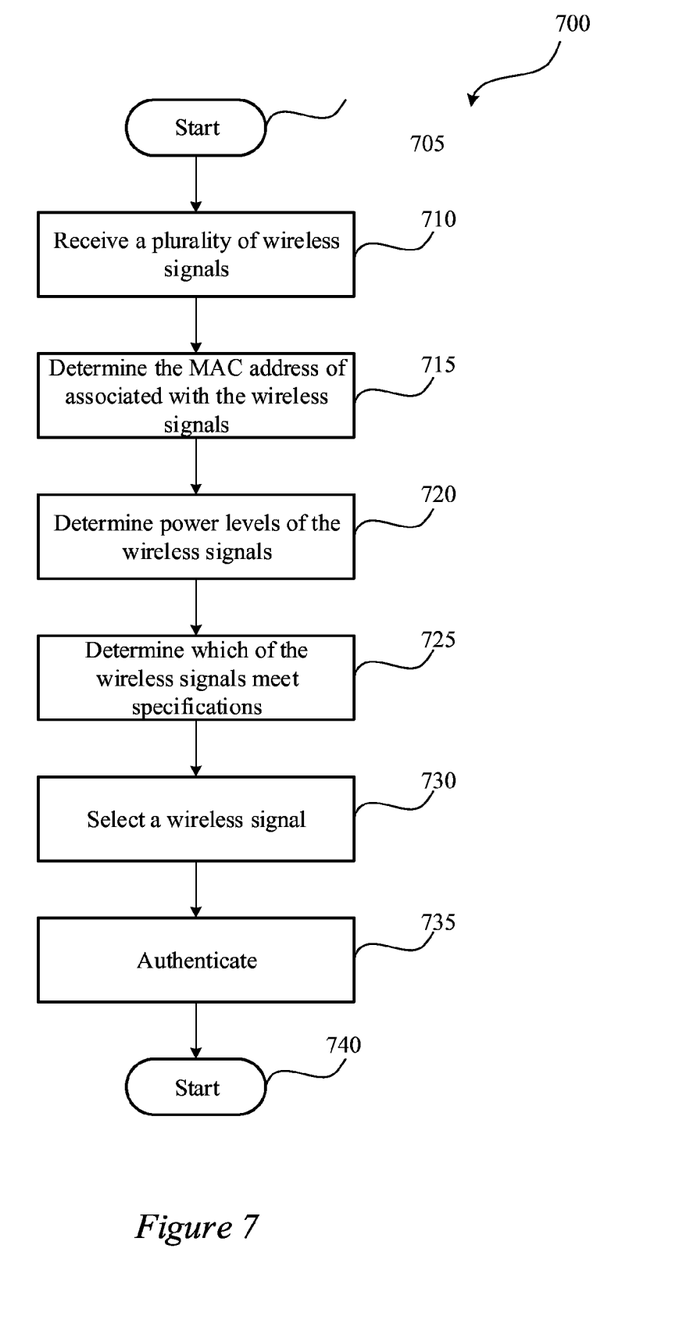
FIG. 7 is an example flowchart of a process for connecting a device with an audio and video control device according to some embodiments described herein.

FIG. 7 is an example flowchart of a process for connecting a device with an audio and video control device according to some embodiments described herein. One or more steps of a process 700 may be implemented, in some embodiments, by one or more components of the computer 215, the tablet 220, or the smartphone 225 of FIG. 2. Although illustrated as discrete blocks, various blocks may be divided into additional blocks, combined into fewer blocks, or eliminated, depending on the desired implementation.

The process 700 begins at block 705. At block 710, a Wireless enabled device may receive a number of Wi-Fi signals. These Wi-Fi signals may include Wi-Fi signals from one or more routers, hotspots, and/or the audio and video control device 100.

At block 715 the MAC address associated with the device that produced the various Wi-Fi signals. At block 720 the power levels of the various Wi-Fi signals may be determined.

At block 725 the it may be determined which of the various wireless signals meet specifications for power levels and/or MAC address. In some embodiments, the specifications may specify that only wireless signals from devices with specific MAC address may be communicated with. This may be done, for example, to lower the number of potential wireless signals the Wireless enabled device may connect with. For example, a school house with an audio and video control device 100 in each classroom and wireless routers positioned throughout the building may have dozens of wireless signals that may be received at a wireless enabled device. The device may be configured, for example, by user entered information to connect only with certain audio and video control devices 100 and/or wireless routers based on MAC address. Thus, a lookup table may be used to identify which wireless signals are associated with approved MAC addresses.

Moreover, in some embodiments, a Wireless enabled device may be configured to work with a subset of the audio and video control devices 100 within a building. The Wireless enabled device may then filter out wireless signals that have a signal power above or below predetermined (or selected) threshold values. This can be done, for example, to filter out wireless signals from audio and video control devices 100 located in other classrooms. Thus, in some embodiments, the specification may limit the number of wireless signals that may be connected to. In some embodiments, the number of wireless signals may be one.

At block 730, a wireless signal may be selected from the subset of wireless signals that remain after block 725. In some embodiments, a wireless signal may be selected based on user input, for example, the user may choose between one or more wireless signals. In some embodiments, a wireless signal may be selected from a plurality of wireless signals remaining after block 725 based on the signal strength of the wireless signals.

At block 735 the wireless enabled device may be authenticated. This can include receiving WPA2 or another authentication protocol data via the wireless signal. The wireless enabled device may then be connected with the audio and video control device 100.

Process 700 may be executed by an application (or app) being executed on the wireless enabled device. For example, a user may be able to access an audio and video control device 100 by opening a specific app on the user's smartphone or tablet. By opening the app, process 700 may execute process 700, among other processes, and connect the smartphone with an audio and video control device 100 and have the audio and video control device 100 authenticated.

Figure 8:
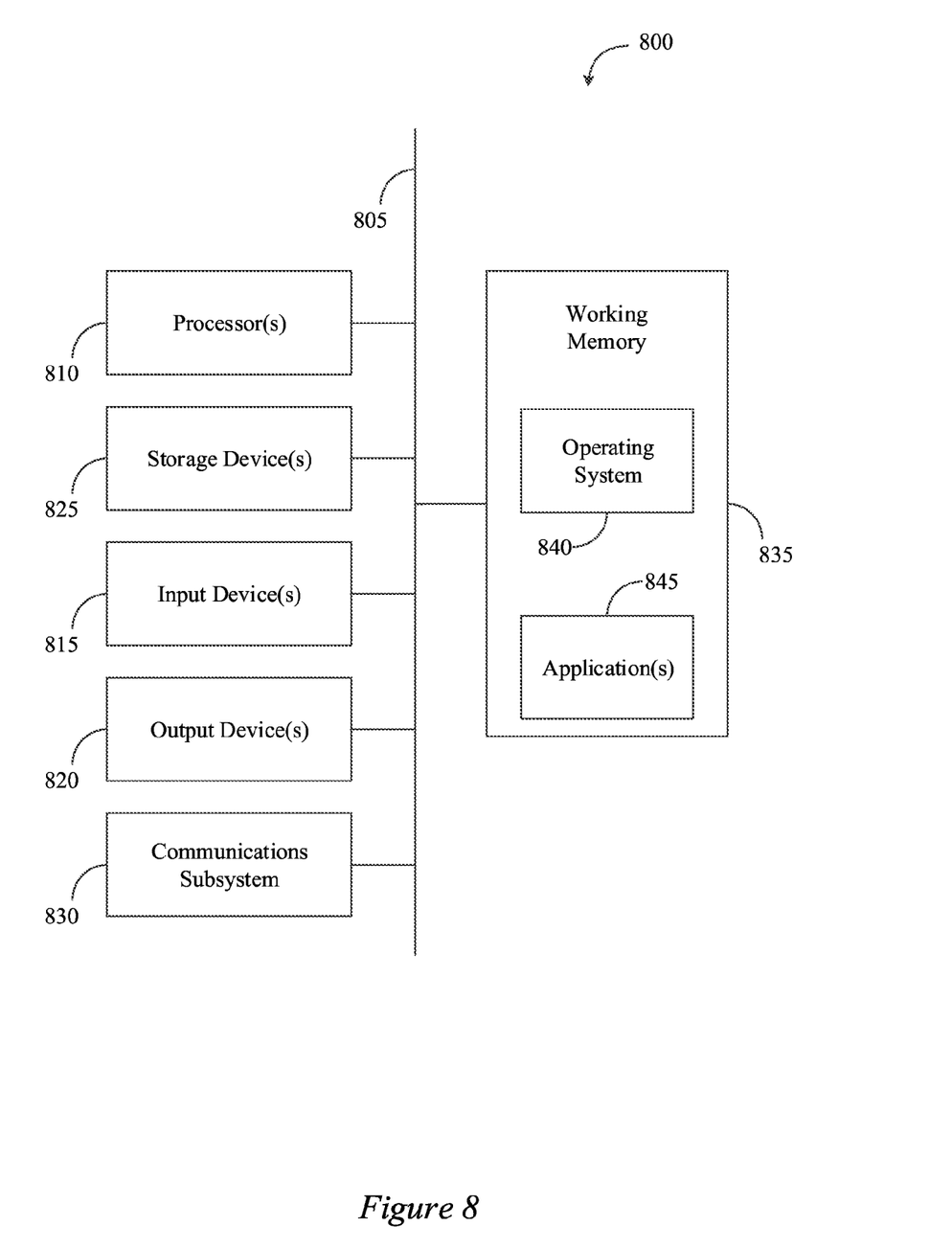
FIG. 8 shows an illustrative computational system for performing functionality to facilitate implementation of embodiments described herein.

A computational system 800 (or processing unit) illustrated in FIG. 8 can be used to perform any of the embodiments of the invention. For example, the computational system 800 can be used alone or in conjunction with other components. As another example, the computational system 800 can be used to perform any calculation, solve any equation, perform any identification, and/or make any determination described here. The computational system 800 includes hardware elements that can be electrically coupled via a bus 805 (or may otherwise be in communication, as appropriate). The hardware elements can include one or more processors 810, including, without limitation, one or more general-purpose processors and/or one or more special-purpose processors (such as digital signal processing chips, graphics acceleration chips, and/or the like); one or more input devices 815, which can include, without limitation, a mouse, a keyboard, and/or the like; and one or more output devices 820, which can include, without limitation, a display device, a printer, and/or the like.

The computational system 800 may further include (and/or be in communication with) one or more storage devices 825, which can include, without limitation, local and/or network-accessible storage and/or can include, without limitation, a disk drive, a drive array, an optical storage device, a solid-state storage device, such as random access memory ("RAM") and/or read-only memory ("ROM"), which can be programmable, flash-updateable, and/or the like. The computational system 800 might also include a communications subsystem 830, which can include, without limitation, a modem, a network card (wireless or wired), an infrared communication device, a wireless communication device, and/or chipset (such as a Bluetooth® device, a 802.6 device, a Wi-Fi device, a WiMAX device, cellular communication facilities, etc.), and/or the like. The communications subsystem 830 may permit data to be exchanged with a network (such as the network described below, to name one example) and/or any other devices described herein. In many embodiments, the computational system 800 will further include a working memory 835, which can include a RAM or ROM device, as described above.

The computational system 800 also can include software elements, shown as being currently located within the working memory 835, including an operating system 840 and/or other code, such as one or more application programs 845, which may include computer programs of the invention, and/or may be designed to implement methods of the invention and/or configure systems of the invention, as described herein. For example, one or more procedures described with respect to the method(s) discussed above might be implemented as code and/or instructions executable by a computer (and/or a processor within a computer). A set of these instructions and/or codes might be stored on a computer-readable storage medium, such as the storage device(s) 825 described above.

In some cases, the storage medium might be incorporated within the computational system 800 or in communication with the computational system 800. In other embodiments, the storage medium might be separate from the computational system 800 (e.g., a removable medium, such as a compact disc, etc.), and/or provided in an installation package, such that the storage medium can be used to program a general-purpose computer with the instructions/code stored thereon. These instructions might take the form of executable code, which is executable by the computational system 800 and/or might take the form of source and/or installable code, which, upon compilation and/or installation on the computational system 800 (e.g., using any of a variety of generally available compilers, installation programs, compression/decompression utilities, etc.), then takes the form of executable code.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing art to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared, or otherwise manipulated. It has proven convenient at times, principally for reasons of common usage, to refer to such signals as bits, data, values, elements, symbols, characters, terms, numbers, numerals, or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical, electronic, or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

That which is claimed:

1. An audio and video control device comprising:
    a Wi-Fi transceiver;
    a video output;
    an audio output;
    a paging input; and
    a controller electronically coupled with the paging input, the Wi-Fi transceiver, the video output, and the audio output, the controller configured to:
        wirelessly communicate with one or more local electronic devices through the Wi-Fi transceiver;
        wirelessly communicate with the Internet through a router;
        receive first video data from a first Internet network location through the Wi-Fi transceiver;
        provide at least a portion of the first video data to a video display through the video output;
        output at least a portion of an audio portion of the first video data via the audio output;
        receive instructions from one of the one or more local electronic devices through the Wi-Fi transceiver;
        receive a paging signal via the paging input;
        pause the video output in response to the paging signal; and
        output the paging signal via the audio output without the audio portion of the first video data.

2. The audio and video control device according to claim 1, wherein the one or more local electronic devices are selected from the group consisting of a computer, a tablet, and a smartphone.

3. The audio and video control device according to claim 1, further comprising a second Wi-Fi transceiver, wherein the Wi-Fi transceiver is configured to operate in an ad hoc mode and the second Wi-Fi transceiver is configured to operate in an infrastructure mode.

4. The audio and video control device according to claim 1, further comprising a microphone input, wherein the controller is further configured to:
    receive audio data through the microphone input;
    mix the audio data and the audio portion of the first video data; and
    output the mixed audio data via the audio output.

5. The audio and video control device according to claim 4, wherein the microphone input comprises a Bluetooth transceiver.

6. The audio and video control device according to claim 1, further comprising a second Wi-Fi transceiver, wherein the controller is further configured to:
    wirelessly communicate with the one or more local electronic devices through the first Wi-Fi transceiver;
    receive the first video data from the first Internet network location through the second Wi-Fi transceiver; and
    receive instructions from one of the one or more local electronic devices through the first Wi-Fi transceiver.

7. The audio and video control device according to claim 1, wherein the controller is configured to:
    receive instructions from one of the one or more local electronic devices through the Wi-Fi transceiver instructing the audio and video control device to switch the video output to a second video data located at a second Internet network location;
    receive at least a portion of the second video data from the second Internet network location through the Wi-Fi transceiver; and
    provide at least a portion of the second video data to the video display through the video output.

8. The audio and video control device according to claim 1, wherein the controller is configured to:
    receive instructions from one of the one or more local electronic devices through the Wi-Fi transceiver instructing the audio and video control device to switch the video output to the second video data from at least one of the local devices;
    receive at least a portion of the second video data from at least one of the local devices; and
    provide at least a portion of the second video data to the video display through the video output.

9. A method comprising:
    broadcasting a Wi-Fi signal from a Wi-Fi transceiver;
    receiving first video data through the Wi-Fi transceiver;
    receiving first control instructions through the Wi-Fi transceiver;

outputting the first video data in response to the first control instructions;
receiving a paging input signal via a paging input;
pausing the first video data in response to the paging signal; and
outputting the paging signal via the audio output without an audio portion of the first video data.

10. The method according to claim 9, further comprising:
receiving second video data through the Wi-Fi transceiver;
receiving second control instructions through the Wi-Fi transceiver; and
outputting the second video data in response to the second control instructions.

11. The method according to claim 9, further comprising:
receiving second video data through the Wi-Fi transceiver;
receiving second control instructions through the Wi-Fi transceiver; and
outputting the second video data in response to the second control instructions.

12. The method according to claim 9, wherein the Wi-Fi transceiver operates in an ad hoc mode.

13. The method according to claim 9, wherein the Wi-Fi transceiver operates in an infrastructure mode.

14. The method according to claim 9, wherein the first control instructions are received from local electronic devices selected from the group consisting of a computer, a tablet, and a smartphone.

15. The method according to claim 9, further comprising:
outputting an audio portion of the first video data to one or more speakers;
receiving audio data through a microphone input;
mixing the audio data and the audio portion of the first video data; and
outputting the mixed audio data to the one or more speakers.

16. The method according to claim 9, further comprising:
broadcasting a first wireless Internet signal from the Wi-Fi transceiver;
broadcasting a second wireless Internet signal from a second Wi-Fi transceiver;
receiving first video data through the second Wi-Fi transceiver;
receiving first control instructions through the first Wi-Fi transceiver; and
outputting the first video data in response to the first control instructions.

17. An audio and video control device comprising:
a Wi-Fi transceiver;
a paging input;
an IR blaster;
a Bluetooth transceiver;
a microphone input;
an HDMI input;
a video output;
an audio output; and
a controller electronically coupled with the Wi-Fi transceiver, the paging input, the Bluetooth® transceiver, the microphone input, the HDMI input, the IR blaster, the video output, and the audio output, wherein the controller is configured to:
receive a video signal from at least one of the Wi-Fi transceiver and the HDMI input;
output at least a portion of the video signal through the video output;
output at least a portion of an audio portion of the video signal through the audio output;
receive audio data from the microphone input;
output the audio data through the audio outputs;
receive a paging signal via the paging input;
pause the video output in response to the paging signal; and
output the paging signal via the audio output without the audio portion of the microphone input and without the audio portion of the first video data.

18. The audio and video control device according to claim 17, further comprising at least one of an IR output, an Ethernet connection, and/or a paging input.

19. The audio and video control device according to claim 17, wherein the Wi-Fi transceiver comprises a first Wi-Fi transceiver and a second Wi-Fi transceiver, with the controller further configured to receive a video signal from at least one of the first Wi-Fi transceiver, the second Wi-Fi transceiver, and the HDMI input.

* * * * *